Nov. 20, 1962   W. A. ALEXANDER   3,065,456
SELF-ORIENTING VIBRATION DETECTOR
Filed Nov. 6, 1958   2 Sheets-Sheet 1
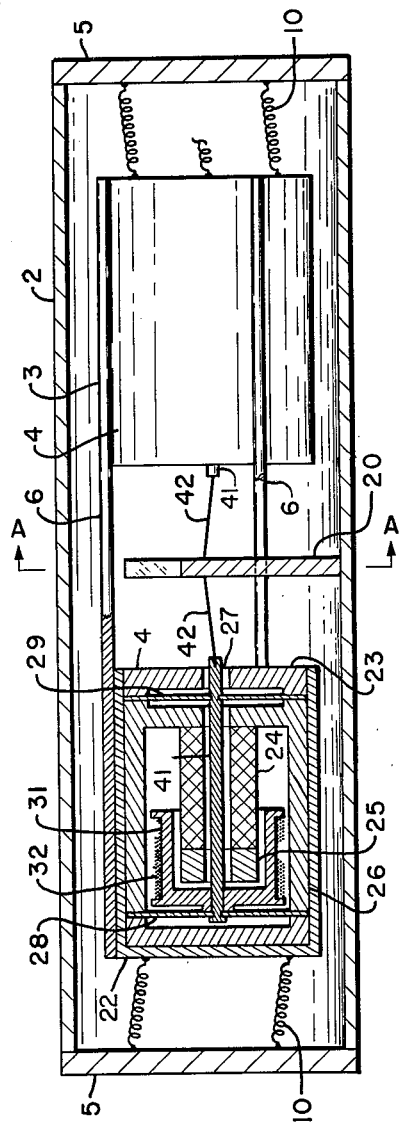
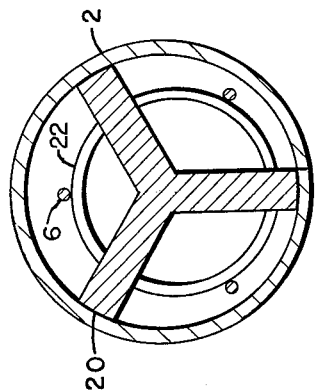
Warren A. Alexander  Inventor
By *James A. Reilly*  Attorney Nov. 20, 1962  W. A. ALEXANDER  3,065,456
SELF-ORIENTING VIBRATION DETECTOR
Filed Nov. 6, 1958  2 Sheets-Sheet 2

Warren A. Alexander  Inventor
By *James A. Reilly*  Attorney 3,065,456
SELF-ORIENTING VIBRATION DETECTOR
Warren A. Alexander, Tulsa, Okla., assignor to Jersey Production Research Company, a corporation of Delaware
Filed Nov. 6, 1958, Ser. No. 772,321
12 Claims. (Cl. 340—17)

This invention relates to vibration sensitive devices and more particularly to a self-orienting vibration detector of high sensitivity which can be easily placed in seismic survey operations with a high degree of coupling between the detector and the earth.

Electrical devices for recording vibrations and for converting seismic impulses into variable electrical energy are commonly called seismometers, seismic detectors, geophones and the like. The most common of these are electromagnetic devices of the variable reluctance and dynamic type. Such electromagnetic seismometers usually consist essentially of a casing in which is yieldingly suspended, by springs or the like, a mass that is movable relative to the case. A winding and means for establishing a magnetic flux through the winding to induce current flow therein are so operatively connected to the casing and to the mass that relative displacement of the casing and the mass results in variation of the flux to generate voltages in the winding. Consequently, when the seismometer casing is supported on or near the surface of the earth and seismic impulses are propagated in the earth by an explosive charge, these impulses are transmitted to the casing which is thus put into motion with respect to the inner mass. This relative motion is thereby converted into electrical energy by reason of the resulting variation in magnetic flux in the seismometer winding.

The present invention is directed to the provision of a detector for seismic surveying apparatus which minimizes the expenditure of time in placing an individual detector or a group or spread of detectors. The device comprises in combination a housing, a seismometer assembly comprising two oppositely disposed seismometers of the moving coil type supported in fixed relative position, the assembly being resiliently suspended within the housing for reciprocal movement with respect thereto, and flexible linking means attached between the coil of each seismometer and the housing adapted to induce coil current flow in response to relative movement between the housing and the seismometer assembly. High sensitivity is provided as the heavy portion of this novel detector is not required to move in response to the earth's vibrations while the lighter elements coupled to the earth's surface easily follow the motion of the earth even though a layer of vegetation is interposed. Thus, the novel detector has the static characteristics of a heavy geophone but the dynamic characteristics of a light instrument.

In the variable reluctance type device variations in magnetic flux are obtained by altering the reluctance of the magnetic circuit. Operation of a dynamic seismometer on the other hand depends upon the fact that either the winding or the means for establishing the magnetic field is supported for displacement with respect to the casing. Recently the most commonly used seismometers have been of the moving coil type in which the position of a coil relative to a magnetic field of substantially constant strength is varied by earth movement causing a cutting of magnetic lines of force by the coil or coils thus generating electric currents or potentials therein. With either type of instrument the electrical energy is then amplified and recorded in a manner conventional in the art of seismic survey. While the present invention is applicable with the variable reluctance type of device, it is particularly concerned with seismometers belonging to the last mentioned group of the electromagnetic type, that is the dynamic geophones.

In many areas it has been difficult to detect reflected seismic waves in such manner that they may be distinguished from high amplitude random and background noises. This has been the case particularly in areas where sub-surface conditions give rise to complex and unintelligible signals. It has been common practice to utilize a great many detectors in such areas in order to suppress by cancellation signals that appear to be due to random noise energy but which may be attributed to disturbed surface or sub-surface conditions. Where, in accordance with the general practice, one or two geophones per trace would be used, as many as thirty geophones per trace have often been found to be desirable. Accordingly, several hundred individual geophones properly oriented and connected to recording equipment may be required for the recordation of a conventional multiple trace seismic record.

Heretofore a major problem involved in the use of such devices in seismic surveying has been the time-consuming tedious efforts necessary to place each and every vibration detector with good ground connection in a position where the instrument was properly oriented to insure correct operation. Without the necessary precautions to insure the proper placement and good mechanical coupling to the earth, a conventional geophone can produce erroneous signals when it is tilted or displaced from a rather restricted operation position.

The present invention obviates the above and other disadvantages of the prior art. More particularly a vertically sensitive, self-positioning vibration detector is provided which conveniently can be included with or as an integral part of a seismic cable. Because of the self-positioning or self-orienting feature of the novel detector a multiplicity of vibration detectors can be connected along a length of seismic cable which can then be simply dragged to the selected location and dropped to the ground whereupon the devices instantly orient themselves for reception of seismic waves.

In accordance with the present invention a self-orienting vibration detector is provided which comprises in combination a housing, a resiliently suspended seismometer assembly comprising two oppositely disposed seismometers of the moving coil type supported in fixed relative position by a rigid framework, and flexible linking means attached between the coil of each seismometer and the housing adapted to induce coil current flow in response to relative movement between the housing and the seismometer assembly. More particularly the invention provides a self-orienting vibration detector of high sensitivity which utilizes the reciprocal movement of a conventional type geophone in response to seismic signals. The movement, in a vertical plane, of the detector housing relative to the seismometer assembly is translated by flexible linking means from the housing to the windings of the pair of oppositely disposed geophones supported in the horizontal position.

In a preferred embodiment of the invention two spaced oppositely disposed seismometers of the moving coil type and supporting means affixing the seismometers in end-to-end fixed relative position form a seismometer assembly which is resiliently suspended within a housing adapted to form a seal impervious to environmental constituents damaging to the electrical components. The reciprocal relative movement of each seismometer in the assembly with the coils in a horizontal position is enabled by the relative vertical motion of the housing through linking means comprising a spacing element mounted on the housing between the seismometers and flexibly connecting the coil of each seismometer to the housing. The flexible linkage is adapted to induce coil current flow in response to relative movement between the housing and the seismometer assembly. This is caused by the differential movement of the coils with respect to the magnetic field of the seismometers and thereby results in a generated signal proportional to the vibration of the seismic signal. It is readily apparent that the problems associated with proper positioning of vibration sensitive devices have been substantially reduced by the novel structure disclosed. Further because of the elongated symmetrical construction, good ground connections can easily be obtained.

A particular feature of the present invention involves the novel design whereby the heavy portion of the vibration detector is not required to move in response to the earth's vibrations. However, the lighter elements which are easily coupled to the earth's surface readily follow the motion of the earth. Heretofore, it has been found that coupling to the earth for recording the seismic energy is of extreme importance under many conditions. For example, in order to assure adequate coupling, geophones have been designed with pointed spikes which must be firmly driven into the earth. Others types of device require spading of the top vegetation for securing a firm plant of the geophone to the earth. These methods also require special effort and time particularly in an exploration operation where surface vegetation does not permit the faithful recording of the earth's motion with conventional vibration detectors. Devices fabricated in accordance with the present invention require no special plant or spikes yet permit excellent coupling to the earth.

Specifically, the present invention provides a vibration detector which comprises a rigid base component of small inertia, including the housing and a pair of windings and a mass of large inertia including magnet assemblies resiliently suspended from the base component for reciprocal movement with respect thereto. Current flow is induced in the signal generating coils or windings in response to the relative movement between the base component and the inner mass of large inertia. Such a detector has a light rugged housing on which is mounted a pair of light coil forms. A relatively heavy seismometer assembly is resiliently supported from the housing in such position that its magnetic fields will pass through the windings of the coils. The inner mass of large inertia comprising the magnetic assemblies causes the detector to seat firmly on the earth. However, a seismic vibration incident on the vibration detector moves only the housing and the coils connected through flexible linking means with the housing while the heavy magnet assemblies remain virtually stationary. Thus, vibrations result in movement only of the light elements of the detector while the seating contact between the detector and the earth is determined by the total weight of the device.

Preferably, the mass ratio of the inner movable mass comprising the seismometer assembly of large inertia to the base component of small inertia is in the range of 1:1 to 15:1. This is accomplished by designing the base component, including the housing, the windings, and the linking means connecting the windings to the housing, to have a mass that is as small as possible. At the same time the inner mass comprising the seismometer assembly is made as high as possible. The inner mass is thus suspended to create a great static force on the base component but the small inertia of the base component, due to its small weight, leads to excellent ground coupling. A mass ratio of at least 1:1 is required to obtain high fidelity recordings. The upper limit of 15:1 is established by structural rigidity considerations for field operations and mass production fabrication processes.

The above and further objects and features of the invention will be more fully appreciated from the following description taken in connection with the accompanying drawing in which:

FIG. 1 is a horizontal sectional view of a vibration responsive device fabricated in accordance with the present invention;

FIG. 2 is a sectional view taken on line A—A of FIG. 1;

Figure 3:
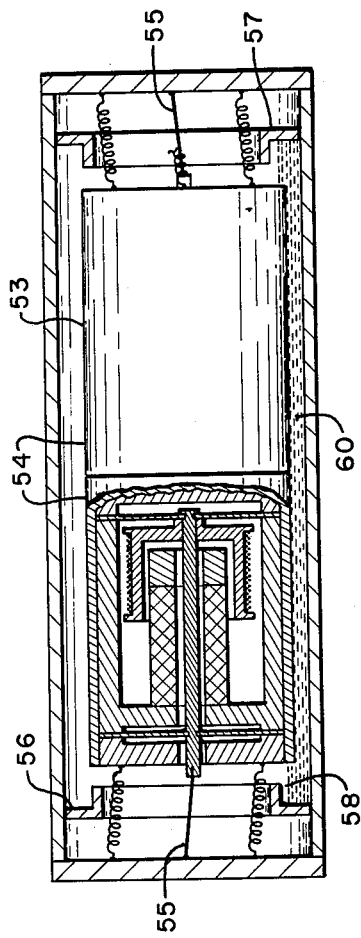
FIG. 3 is a horizontal sectional view similar to FIG. 1, illustrating an alternative arrangement of a seismometer device embodying suspension means adapted for viscous fluid damping.

In order to facilitate a complete understanding of the invention the specific embodiments shown in the drawing are hereinafter described in detail. It will nevertheless be understood that restriction of the scope of the invention is not thereby intended and that such changes and modifications are contemplated as would occur to one skilled in the art to which the invention relates.

Referring now to FIG. 1, a vibration detector unit embodying the present invention has been illustrated in diagrammatic form as comprising an elongated light weight housing 2 of rigid construction containing therein a seismometer assembly 3 comprising two oppositely disposed magnetic seismometers 4 of the moving coil type. The entire assembly is resiliently suspended within the housing for reciprocal movement with respect thereto by suspension means 10 attached to the housing.

The self-orienting feature of detectors fabricated in accordance with the present invention depends in part upon the use of a housing symmetrical about its longitudinal axis. Such a housing can be simply a frame designed to support the seismometer assembly resiliently suspended therewithin. However, generally a closed housing impervious to environmental constitutuents will be employed. Preferably the housing will be of elongated cylindrical construction thereby insuring that the device will be self-positioning upon a vibrating surface by reason of its symmetry. In the embodiment shown in FIG. 1, the housing 2 is a tubular housing having closed ends 5 and, for example, can be fabricated of aluminum, brass, or the like.

Resiliently suspended within housing 2 from suspension means 10, which can be coil springs, tension springs, elastic or rubber mountings, or the like, attached to the ends of the tubular housing, is a seismometer assembly 3, comprising two oppositely disposed seismometers 4 the moving coil type supported in fixed relative position upon a suitable framework 6. The seismometers, which can be conventional electromagnetic geophones, are of the type in which light weight moving coil cuts constant lines of force. The output of each geophone is supplied through suitable conductors, not shown, to an amplifier device for amplification of the electric currents and then to a recording device, neither device being shown in the drawing.

Referring now particularly to the seismometer shown in cross section, it is seen that the detector device comprises a main cylindrical casing 22 preferably formed of brass, or aluminum, or the like, but which can be of any non-magnetic material. Suitable means, not shown, are provided to permit electrical conductors to extend into a chamber defined within the casing 22 to make electrical connection with the moving coil of the seismometer. Disposed within the chamber is a magnetic assembly comprising an annular permanent magnet 24 having a small bore cylindrical hole drilled through its longitudinal axis, a pole piece 25, and a pole ring 26, assembled to define, between portions of the pole piece and pole ring, a uniform annular air gap having substantially uniform lines of force passing therethrough. Magnet 24 can be formed of any magnetic material such as, for example, the type now available on the market and designated commonly by the term "Alnico."

For the purpose of supporting an electrical winding or coil within the air gap defined between the pole piece 25 and pole ring 26 to cut the constant lines of force across the air gap in response to movement of a coil within this air gap, there is provided a suitable coil form, designated at 31, comprising a somewhat cup-shaped spool of aluminum or other non-magnetic material with its open end disposed to receive the projection of the magnet pole piece 25. Wound around the outer surface of this cup-shaped spool is an electrical winding or coil 32. The lower end of the coil form is provided with a central supporting means having an elongated shaft 41 of light weight construction extending therefrom which can be threaded therein. Such shaft is parallel to the axis of the tubular housing and the geophone casing and projects through an aperture 27 in the base plate 23 of the casing of the seismometer. Coil form 31 is supported from suitable flat disc positioning springs designated at 28 and 29 which have their outer edges respectively disposed on the outer case 22. Thus, the entire coil form is resiliently mounted in the seismometer for reciprocal horizontal movement with respect thereto and together with its supporting shaft forms a rigid component of small inertia which in accordance with this invention is coupled to the earth by being linked to a light weight housing which is placed in contact with the earth.

A suitable seismometer assembly comprises two oppositely disposed seismometers of the type which have been described above. These are supported as by clamping means or the like in fixed relative position by suitable supporting means adapted to couple the seismometers into one integral assembly. In FIG. 1 seismometers 4 are supported in spaced end-to-end, fixed relative position by means of a rigid framework consisting of elongated support rods 6 affixed to the outer surface of the casing of each seismometer in a symmetrical arrangement. The entire seismometer assembly consisting of the two geophones and the support rods to which they are affixed is resiliently suspended within the cavity of tubular housing 2 from suspension means 10 which in the embodiment shown comprises three symmetrically placed coil springs attached at either end between the seismometer assembly and the end of the tubular housing.

What has been described thus far is a closed tubular housing containing resiliently suspended therein a seismometer assembly comprising two spaced oppositely disposed seismometers of the moving coil type and means supporting these seismometers in end-to-end fixed relative position. In order to connect the coil form in each seismometer casing together and to the detector housing in a manner adapted to induce current flow in each coil disposed in a horizontal position in response to relative vertical movement between the housing and the seismometer assembly there is disposed between the seismometers a spacing element 20 which is affixed to the tubular housing. Flexible tensile members 42, which can be nylon cord, glass fiber, linked segments of rigid steel lengths, piano wire, or the like, are attached between spacing element 20 and the ends of the rigid shafts 41 extending from each of the seismometer casings to form a linking means flexibly connecting the coil of each seismometer to the tubular housing adapted to induce coil current flow in response to relative movement between the housing and the seismometer assembly.

FIG. 2, a sectional view taken on line A—A of FIG. 1, illustrates the spacing element 20 in the form of a flat Y-shaped element affixed to the housing 2 of the vibration detector at three points. The completed device is fabricated, for example, by constructing the seismometer assembly, comprising the two spaced oppositely disposed seismometers supported in fixed position upon support rods 6 to form a rigid framework, with the spacing element in position straddling support rods 6 and then inserting it into the tubular housing. Thereafter, the spacing element is permanently affixed to the housing by mechanical means such as solder or the like. Coil springs can then be attached to either end of the seismometer assembly and to the end plates 5 of the housing which are then affixed to close the tubular housing 2.

From the above description it will be apparent that there has been described a very compact self-orienting vibration detector which utilizes the reciprocal movement of a pair of conventional type dynamic geophones in response to seismic signals to provide a laterally symmetrical device capable of self-orienting operation. The design embodies the principle of high ratio of inner fixed mass to moving mass, preferably in the range of 1:1 to 15:1, the greater mass acting through the supporting elastic system to force the lesser mass into firm contact with the earth. The novel design thus insures the faithful recording of the earth's motion since the lesser moving mass, comprising the housing and the two seismometer coils with the associated linkage system, has but little inertia, yet is held in contact with the earth by the force equal to the large mass comprising the remainder of the seismometer assembly.

From the above-detailed description it is believed that the operation of the self-orientation vibration detector will be apparent to those skilled in the art. When the device, utilized in the horizontal position, is in contact with the vibrating surface or, for example, in contact with the surface of the earth, the vibrations or seismic waves are transmitted to the case. The weight of the intertial members in the case maintains flexible tensile members 42 in tension and results in the stressing of positioning springs 28 and 29. Any vertical movement of the case with respect to the intertial mass results in a change in the stresses in the positioning springs. Such a change results in horizontal movement of shafts 41 and the attached coil assemblies with respect to the surrounding magnet assemblies. This in turn results in the generation of a signal indicative of the vertical movement. By means of its elongated symmetrical form good ground coupling is easily obtained by simply placing the cylindrical detector on the earth's surface. Moreover by reason of its symmetrical construction the device is self-positioning. Any portion of the outer circumference of the cylindrical housing can be in contact with the earth. Thus, it is seen that the detector can simply be dropped or rolled out along the surface of the earth and the seismometer assembly which is suspended symmetrically about its axis in the housing falls immediately into a self-oriented operative position.

In a seismic operation in the field the self-orienting vibration responsive device is placed on the ground and an explosive is detonated at a distance from it. The rigid lightweight component comprising the housing and the two coils together with the linking means moves in response to vibrations of the earth. The core and the magnet assembly of each seismometer resiliently suspended within the casing have a substantial amount of inertia and therefore the seismometer assembly tends to remain stationary. The earth's vibrations, therefore, cause movement only of the lighter elements of the detector and permit the massive elements to remain stationary during the length of time that a desired seismic reflection is being received. As the device is dynamically light, faithful recording of the earth's motion through grass or other vegetation is insured because the detector is held in contact with the earth by a force equal to the sum of the large mass comprising the seismometer assembly and the light mass comprising the case, coils and connecting members.

An alternative arrangement of a vibration detector embodying suspension means adapted for viscous fluid damping is shown in FIG. 3. The vibration detector shown in FIG. 3 differs from the one previously described primarily in that a viscous damping means is employed. In this embodiment the seismometer assembly 53 comprises two oppositely disposed seismometers 54 supported in end-to-end fixed relative position. The base of the casing of each seismometer is affixed to the other by suitable support means which for example, can be solder, or a welded or threaded connection, or the like. The entire assembly is resiliently suspended from the housing of the detector in the manner described above for the device of FIG. 1. Flexible tensile members 55 attached between the ends of the detector housing and the rigid shafts upon which the coil forms are mounted form the flexible linking means adapted to induce coil current flow in response to relative movement between the housing and the seismometer assembly. Disposed within the cylindrical housing are two damping fluid retaining plates 56 and 57 each having an outer diameter of the approximate dimension of the inner diameter of the cylindrical housing and each having an aperture at the center surrounded by a raised fluid retaining lip. These damping fluid retaining plates define an inner chamber 58 in which the seismometer assembly is resiliently suspended. This chamber contains a viscous damping fluid 60, which in the embodiment shown can be, for example, silicone fluid. In general any viscous inert fluid is suitable for use as a damping fluid. Preferably the fluid is a silicone type having a viscosity in the range of 100 to 500 centistokes. It should be viscous enough that it does not splash over the lips of the retaining wall of the fluid retaining plates.

Figure 4:
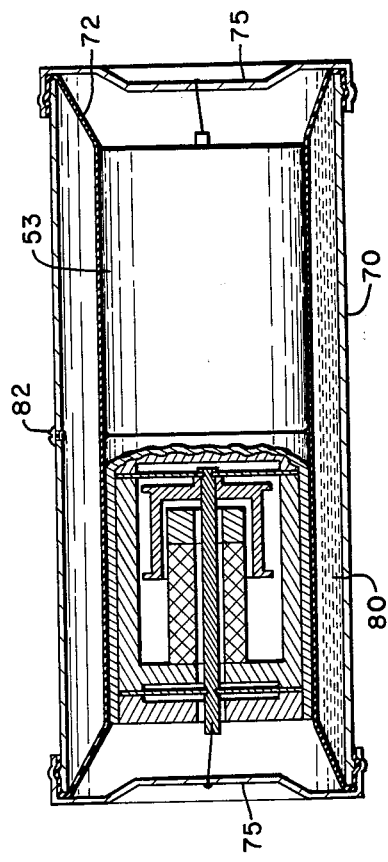
FIG. 4 is a horizontal sectional view of another alternative arrangement.

FIGURE 4 illustrates a modified self-orienting vibration detector adapted for viscous damping in the manner of the device shown in FIGURE 3. In this embodiment the seismometer assembly 53 is resiliently suspended in a tubular housing 70 by being enclosed in an elastic sleeve 72 such as a rubber hose clamped at each end to the mouth of the tubular housing by means of end cups 75 snapped over the ends of the projecting rubber sleeve. Viscous damping fluid 80 can be inserted within the space between the sleeve and the housing through a filling hole closed by screw 82.

It is understood that vibration sensitive detectors fabricated in accordance with the present invention can be placed at specific distances along the length or made an integral part of the seismic cable. The detectors themselves are automatically and instantly oriented for detection of seismic waves at all times. Further it will be apparent that modifications in the self-orienting vibration detector described and illustrated can be made without changing the fundamentals of operation. For example, it may be advantageous to use other forms of damping such as air or electromagnetic damping rather than viscous fluid damping. While specific embodiments of the present invention have been described it will be evident to one skilled in the art that various other changes can be made without departing from the spirit or scope of the invention, and it is intended to embrace such changes in the appended claims.

What is claimed is:

1. A self-orienting vibration detector which comprises in combination a housing, a seismometer assembly comprising two oppositely disposed seismometers of the moving coil type affixed to means supporting said seismometers in fixed relative position, said assembly being resiliently suspended within said housing for reciprocal movement with respect thereto, and flexible linking means connected between the coil of each seismometer and said housing for moving the seismometer coils within said seismometer assembly in response to relative movement between said housing and said assembly.

2. A self-orienting vibration detector which comprises in combination a rigid housing symmetrical about its longitudinal axis, a seismometer assembly comprising two oppositely disposed seismometers of the moving coil type supported in fixed relative position, said assembly being resiliently suspended within said housing for reciprocal movement with respect thereto, and a flexible tensile member connecting the coil of each seismometer with said housing for moving the seismometer coils within said seismometer assembly in response to relative movement between said housing and said assembly.

3. A self-orienting vibration detector which comprises in combination a closed tubular housing, a seismometer assembly comprising two spaced oppositely disposed seismometers of the moving coil type and means supporting said seismometers in end-to-end fixed relative position, said assembly being resiliently suspended within said housing for reciprocal movement with respect thereto, and a flexible cord connecting the coil of each seismometer to said housing for moving the seismometer coils within said seismometer assembly in response to relative movement between said assembly and said housing.

4. A self-orienting vibration detector which comprises in combination a closed tubular housing, a seismometer assembly comprising two spaced oppositely disposed seismometers of the moving coil type and means supporting said seismometers in end-to-end fixed relative position, said assembly being resiliently suspended within said housing for reciprocal movement with respect thereto from coil springs attached to said housing, and an elongated flexible tensile member connecting the coil of each seismometer to said housing for moving the seismometer coils within said seismometer assembly in response to relative movement between said assembly and said housing.

5. A self-orienting vibration detector which comprises in combination a housing, a seismometer assembly comprising two spaced oppositely disposed seismometers of the moving coil type affixed to means supporting said seismometers in fixed relative position, said assembly being resiliently suspended within said housing for reciprocal movement with respect thereto, and linking means comprising a spacing element intermediate said seismometers rigidly affixed to said housing in a plane perpendicular to the longitudinal axis thereof flexibly connecting the coil of each seismometer to said housing, said linking means being adapted to induce coil current flow in response to relative movement between said housing and said seismometer assembly, and each of said seismometers including a casing having a limited aperture therein, a magnet assembly, a coil form resiliently suspended in said casing for reciprocal movement with respect thereto, a rigid shaft supporting said coil form mounted on one end, the other end of which extends therefrom through said aperture in said casing, a signal generating coil mounted on said coil form in which coil current flow is induced in response to relative movement between the casing and said coil form, and a flexible tensile member connecting said spacing element with the end of the rigid shaft extending from said seismometer casing.

6. A self-orienting vibration detector in accordance with claim 5 wherein said housing is a rigid tubular housing having closed ends and said assembly is suspended within said housing for reciprocal movement with respect thereto from coil springs attached to the ends of said housing.

7. A self-orienting vibration detector in accordance with claim 5 wherein said seismometer assembly comprises two spaced oppositely disposed seismometers or the moving coil type affixed to a rigid framework comprising elongated support rods secured to the casing of each seismometer in symmetrical arrangement.

8. A self-orienting vibration detector in accordance with claim 7 wherein said spacing element intermediate said seismometers is a flat Y-shaped support member rigidly affixed to said housing in a plane perpendicular to the longitudinal axis thereof the arms of which straddle the support rods of said seismometer assembly.

9. A self-orienting vibration detector which comprises a base component of small inertia and a mass of large inertia resiliently suspended from said base component for reciprocal vertical movement with respect thereto, wherein the mass ratio of said mass of large inertia to said base component is in the range of 1:1 to 15:1, said mass of large inertia comprising a seismometer assembly including two oppositely disposed geophones of the moving coil type supported in fixed relative position, and said base component of small inertia comprising a housing within which said assembly is suspended, the coil of each of said geophones, and flexible linking means connecting each said coil to said housing.

10. A self-orienting vibration detector which comprises in combination a housing, a seismometer assembly comprising two oppositely disposed seismometers of the moving coil type affixed to means supporting said seismometers in fixed relative position, said assembly being resiliently suspended within said housing for reciprocal movement with respect thereto, and flexible linking means attached between the coil of each seismometer and said housing comprising a spacing element intermediate said seismometers rigidly affixed to said housing in a plane perpendicular to the longitudinal axis thereof and two elongated flexible tensile members connecting said spacing element with the moving coil in each of said seismometers for moving the seismometer coils within said seismometer assembly in response to relative movement between said housing and said assembly.

11. A self-orienting vibration detector which comprises in combination a tubular housing having closed ends, a seismometer assembly comprising two oppositely disposed seismometers of the moving coil type affixed to means supporting said seismometers in end-to-end fixed relative position, and flexible linking means connecting the coil of each seismometer to the ends of said housing for moving the seismometer coils within said seismometer assembly in response to relative movement between said housing and said assembly, said assembly being resiliently suspended within said housing for reciprocal movement with respect thereto.

12. A self-orienting vibration detector which comprises in combination a housing, a seismometer assembly comprising two oppositely disposed seismometers of the moving coil type affixed to means supporting said seismometers in end-to-end fixed relative position, said assembly being resiliently suspended in said housing for reciprocal movement with respect thereto, and linking means flexibly connecting the coil of each seismometer to said housing said linking means being adapted to induce coil current flow in response to relative movements between said housing and said seismometer assembly, and each of said seismometers including a casing having a limited aperture therein, a magnet assembly, a coil form resiliently suspended in said casing for reciprocal movement with respect thereto, a rigid shaft supporting said coil form mounted on one end the other end of which extends therefrom through said aperture in said casing, a signal generating coil mounted on said coil form in which coil current flow is induced in response to relative movement between the casing and said coil form, said flexible linking means comprising an elongated flexible tensile member connecting the rigid shaft extending from each seismometer casing to said housing.

References Cited in the file of this patent

UNITED STATES PATENTS

| | | |
|---|---|---|
| 2,304,738 | McCarty | Dec. 8, 1942 |
| 2,390,187 | Sharpe | Dec. 4, 1945 |
| 2,706,401 | Spaulding | Apr. 19, 1955 |
| 2,913,701 | Wachholz | Nov. 17, 1959 |